Figure 1:
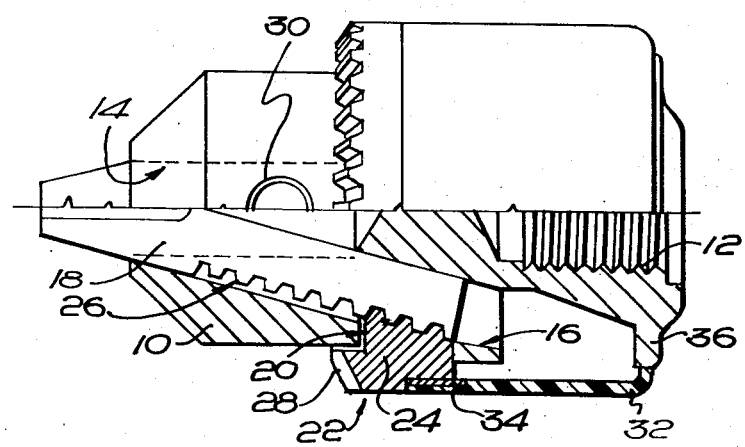

United States Patent [19]
Derbyshire

[11] 3,810,642

[45] May 14, 1974

[54] DRILL CHUCKS

[75] Inventor: George Cecil Derbyshire, Sheffield, England

[73] Assignee: The Jacobs Manufacturing Company Limited, Sheffield, England

[22] Filed: Apr. 28, 1972

[21] Appl. No.: 248,543

[30] Foreign Application Priority Data
July 21, 1971  Great Britain.................... 34252/71

[52] U.S. Cl............................... 279/62, 279/1 ME
[51] Int. Cl............................................. B23b 31/04
[58] Field of Search............ 279/60, 61, 62, 63, 64, 279/65, 1 K, 1 ME

[56] References Cited
UNITED STATES PATENTS
3,462,164   8/1969   Wightman........................... 279/62

FOREIGN PATENTS OR APPLICATIONS
373,488      7/1939   Italy..................................... 279/60
1,035,672   7/1966   Great Britain....................... 279/60

Primary Examiner—Andrew R. Juhasz
Assistant Examiner—Z. R. Bilinsky
Attorney, Agent, or Firm—Sandoe, Hopgood & Calimafde

[57] ABSTRACT

A drill chuck having a body part and a cylindrical sleeve connected to the usual nut member engaging the jaws, the cylindrical sleeve extending rearwardly to engage a cylindrical portion of the body remote from the nut member.

3 Claims, 4 Drawing Figures

DRILL CHUCKS

The invention relates to drill chicks and has for its object to provide an improvement therein.

According to the invention, a drill chuck is provided with a body part in which jaws are slidably mounted for convergng movement in respective guides; a nut member rototably mounted on the body part but axially located in a circumferential groove encircling said body part, said nut member having screwthreaded engagement with said jaws for advancing said jaws through a forward portion of the body part to grip a drill shank; and a cylindrical sleeve connected to said nut member and extending rearwardly of the body part to rotatably engage a cylindrical portion of the body part remote from the nut member. The nut member may be formed integrally with a gear element with which the teeth of an extraneous chuck key may be engaged to tighten or slacken the jaws. Alternatively, such a gear element may be formed separately from said nut member and be non-rotatably connected thereto on assembly (for example, the gear element may be formed as part of the cylindrical sleeve). It is in fact preferable that the gear element should be formed separately from the nut member because since the latter must be formed in halves so that it can be located in the circumferential groove in the body part, it can conveniently be held together by the gear element or by the cylindrical sleeve on which the gear element is formed as an unbroken part. In either case, however, the body part will be provided with at least one radial aperture for the reception of a pilot end of such an extraneous key. The cylindrical sleeve may be made of a synthetic plastics material but in this case will preferably have a metal reinforcing member to strengthen it at its end which is connected to the nut member (the gear element previously referred to may be formed integrally with such a metal reinforcing member). The cylindrical portion of the body part remote from the nut member, with which the cylindrical sleeve is rotatably engaged, will preferably be substantially the same diameter as the said nut member.

Figure 2:
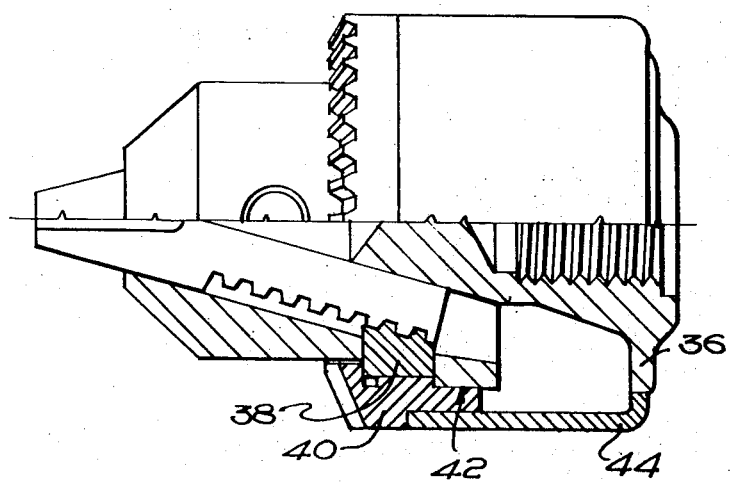
Figure 3:
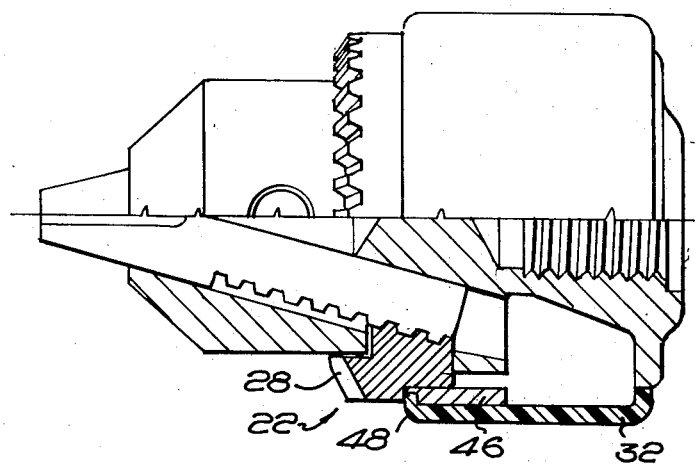
Figure 4:
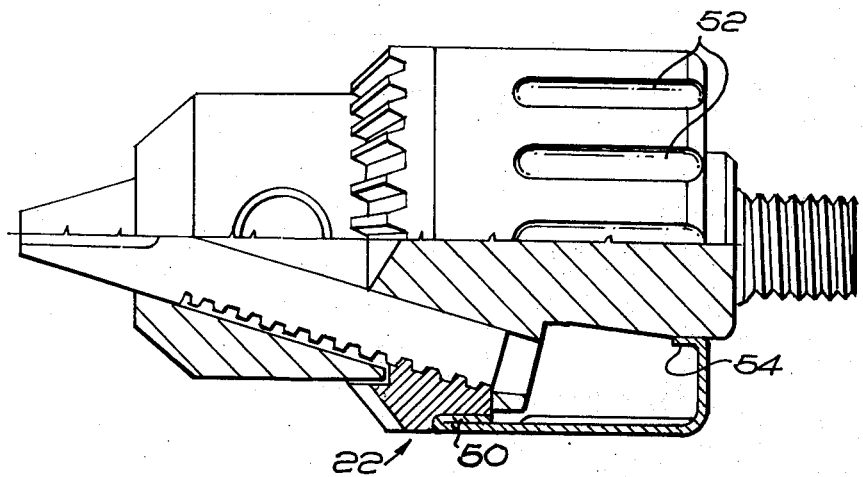

In order that the invention may be fully understood and readily carried into effect, the same will now be described, by way of example only, with reference to the accompanying drawings, of which:

FIG. 1 is a side view, partly in longtiduinal section, of a drill chuck embodying the invention, and FIGS. 2 to 4 are similar views illustrating possible modifications.

Referring now to FIG. 1, the drill chuck there illustrated includes a body part 10 having at one end a screw-threaded recess 12 for the reception of a power tool driving spindle (not shown) and at its other end an axially extending bore 14 for the reception of a drill shank (not shown). Three equally spaced bores 16, only one of which is shown in the drawing, diverge from the axially extending bore for the reception of respective jaws 18, the jaws being slidably mounted in the bores 16 so that as they are advanced they converge to grip a drill shank between parallel end portions and when they are retracted into the body part they release the shank.

A circumferential groove 20 extends around the body part intermediate the ends of the latter and breaks into the bores 16. An integral nut and bevel gear element generally indicated 22, formed in halves, engages the groove so that the nut portion 24 thereof, which is formed with a tapering internal screwthread, has threaded engagement with thread elements 26 of the jaws 18. The bevel gear portion of the element 22 surrounds a cylindrical portion of the body part in which three equally spaced radial blind bores 30 are formed, siad blind bores being provided for the reception of a pilot end of an extraneous chuck key (not shown) having a bevel pinion capable of engaging the teeth of the bevel gear portion 28. In this way, the chuck jaws can be simultaneously advanced or retracted, as required, in known manner.

The integral nut and bevel gear element 22, which as previously stated is in halves, is axially located by its engagement in the groove 20 and is held together by a cylindrical sleeve 32 made of a synthetic plastics material with a metal reinforcing member 34 moulded in it at one end to provide a tight band encircling the element 22. The integral nut and bevel gear element is stepped for the reception of the reinforced end of the sleeve and the outside diameter of the sleeve is the same as that of the bevel gear portion 28 of the element 22. The end of the sleeve remote from the integral nut and bevel element is inturned and engages rotatably on the periphery of a flange 36 which is integral with the body part at that end at which the screwthreaded recess 12 is formed.

Thus there is provided a drill chuck which by virtue of its construction is somewhat cheaper to produce than similar chucks of conventional construction. However, various modifications may be made to the chuck just described. For example, in FIG. 2 there is illustrated a drill chuck which is basically the same as that shown in FIG. 1 except that the integral nut and bevel gear element 22 has been replaced by separate nut and bevel gear elements 38 and 40. In this case, the nut element alone is formed in halves so that it can be engaged in the groove 20. The bevel gear element is formed as an unbroken ring which encircles the nut to hold it together. It is in fact an interference fit on the nut element so that it can transmit drive to the latter. The bevel gear element registers on a cylindrical portion 42 of the body part which acts as a bearing for the assembled nut and bevel gear elements. A cylindrical sleeve 44 encircles a part of the gear element at one end and the flange 36 at the other in the same way as the sleeve 32 in the chuck described with reference to FIG. 1. However, it will be understood that since the sleeve in this case plays no part in holding together the halves of the split nut it need not be provided with a moulded-in metal reinforcing member, that is to say if it is made of a synthetic plastics material. It will be understood that the sleeve could be made of steel (either of drawn tube or machined from the solid) in either one of the constructions illustrated.

In FIG. 3, there is illustrated a further possible modification in which the integral nut and bevel gear element 22, formed in halves, is held together by a substantial metal band 46 which has been forced onto the stepped portion of the integrally formed nut and bevel gear element before the cylindrical sleeve 32 has been assembled in position. In this case, the cylindrical sleeve is very slightly inturned as shown at its end 48 which encircles the metal band and the latter is stepped so that the cylindrical sleeve is able to snap into position therein. The sleeve is of course made of a synthetic plastics material and is able to be forced over the wider part of the metal band on assembly. In this case of course the outside diameter of the cylindrical sleeve is somewhat greater than that of the bevel gear portion 28 of the element 22 but the corner of the sleeve is smoothly radiused so that this fact is not regarded to be a serious disadvantage.

In FIG. 4 there is illustrated a still further possible modification in which the sleeve 32 is made as a pressing from a relatively light gauge metal plate. Substantial strength has been imparted thereto by forming it with a completely inturned edge 50 at that end which tightly encircles the integral nut and bevel gear element 22. The metal sleeve has also been formed with a series of flutes 52 which further strengthen the light gauge wall of said sleeve and in addition provide a convenient gripping surface for the users hand when he requires to make manual adjustments. In addition, to increase the bearing area between the sleeve and the body part at the end of the sleeve remote from the integral nut and bevel gear element, the width of the flange 36 formed on said body part has been increased and that end of the sleeve has been formed with a completely inturned flange 54 which extends concentrically within the generally cylindrical shape of the sleeve.

It will of course be understood that although the improved sleeve illustrated in FIG. 4 is shown encircling an integral nut and bevel gear element 22, it could equally well be used in association with separate nut and bevel gear elements as illustrated in FIG. 2. It will also be understood that in any of the constructions including a sleeve made of a synthetic plastics material, said sleeve may be formed with a series of flutes such as the flutes 52 shown in FIG. 4 and may also be provided with a completely inturned flange such as flange 54 shown in FIG. 4.

Various other modifications could be made without departing from the scope of the invention. For example, it will be understood that the end of the cylindrical sleeve which encircles the flange 36 need not necessarily be inturned, that is to say, if that end of said sleeve is of plain cylindrical form the diameter of the flange 36 may be increased to form a bearing co-operating with the internal diameter of the sleeve. It will also be understood that the body part may be adapted for connection to any kind of power tool driving spindle, that is to say, for example, it may be provided with a screwthreaded spigot portion instead of the internally screwthreaded recess 12.

What I claim and desire to secure by Letters Patent is:

1. A drill chuck comprising a body part; jaws slidably mounted for converging movement in respective guides in said body part; a nut member rotatably mounted on said body part but axially located in a circumferential groove encircling said body part, said nut member having screw-threaded engagement with said jaw members; a gear element with which an extraneous chuck key may be engaged for adjusting the jaws, said gear element being formed integrally with the nut member, the two being formed in halves so that the nut member can be located in the circumferential groove encircling the body part; and a generally cylindrical sleeve connected to said nut member and extending rearwardly of the body part to rotatably engage a cylindrical portion of the body part remote from said nut member, said sleeve being made as a pressing from light gauge metal plate and having a completely inturned edge at the end which tightly encircles at least a part of the gear element and which holds the two halves of the integrally formed nut member and gear element together.

2. A drill chuck according to claim 1, in which the generally cylindrical sleeve has been formed with a series of flutes which strengthen the wall of said sleeve and provide a convenient gripping surface.

3. A drill chuck according to claim 1, in which the generally cylindrical sleeve has been formed at its end remote from the integrally formed nut member and gear element with a completely inturned flange which extends concentrically within the generally cylindrical shape of the sleeve to form a bearing surface between the sleeve and the body part.

* * * * *